(12) United States Patent
Kaertner et al.

(10) Patent No.: US 8,798,106 B2
(45) Date of Patent: Aug. 5, 2014

(54) MODE-LOCKING WITH REDUCED NONLINEARITY USING GAIN-MATCHED OUTPUT COUPLERS

(75) Inventors: Franz X. Kaertner, Newtown, MA (US); Li-Jin Chen, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/084,808

(22) Filed: Apr. 12, 2011

(65) Prior Publication Data

US 2011/0310914 A1   Dec. 22, 2011

Related U.S. Application Data

(60) Provisional application No. 61/325,434, filed on Apr. 19, 2010.

(51) Int. Cl.
*H01S 3/098* (2006.01)
(52) U.S. Cl.
USPC ............................................. 372/18; 372/108
(58) Field of Classification Search
USPC .................................................... 372/18, 108
See application file for complete search history.

(56) References Cited

U.S. PATENT DOCUMENTS

| | | | |
|---|---|---|---|
| 6,407,855 B1 * | 6/2002 | MacCormack et al. | 359/346 |
| 2003/0161364 A1 * | 8/2003 | Perry | 372/35 |
| 2007/0002907 A1 * | 1/2007 | Ell et al. | 372/18 |
| 2009/0086771 A1 * | 4/2009 | Usui et al. | 372/18 |

OTHER PUBLICATIONS

Korean Intellectual Property Office, International Search Report and Written Opinion for PCT/US2011/032603 (corresponding PCT application) (Jan. 2, 2012).
Birge, Jonathan R. et al., "Efficient optimization of multilayer coatings for ultrafast optics using analytic gradients of dispersion", Applied Optics, vol. 46, No. 14 (May 10, 2007), pp. 2656-2662.
Chen, Li-Jin et al., "Mode Locking with Minimum Nonlinearity Using Inverse-Gain Output Couplers", Conference on Lasers and Electro-Optics, Optical Society of America (May 16, 2010), pp. 1-2.
Chen, Li-Jin et al., "Kerr-lens mode locking with minimum nonlinearity using gain-matched output couplers", Optics Letters, vol. 35, No. 17 (Sep. 1, 2010), pp. 2916-2918.
J. Barty, C. P., et al., "Regenerative pulse shaping and amplification of ultra broadband optical pulses", Optics Letters, vol. 21, No. 3 (Feb. 1, 1996), pp. 219-221.

* cited by examiner

*Primary Examiner* — Yuanda Zhang
(74) *Attorney, Agent, or Firm* — Modern Times Legal; Robert J. Sayre (57) ABSTRACT

A laser cavity includes a gain medium for amplifying a light pulse in a light path, wherein the gain medium has a gain profile for amplifying the light pulse as a function of wavelength; at least one mirror on one side of the gain medium; and an output coupler. The output coupler has an output coupling profile for inducing loss in the light pulse as a function of wavelength that substantially matches the saturated gain profile of the gain medium across a range of lasing wavelengths. The purpose of this device is to achieve a flattened net-gain profile to substantially improve mode-locking performance with respect to self-starting, beam-quality, and broadband operation.

20 Claims, 6 Drawing Sheets

MODE-LOCKING WITH REDUCED NONLINEARITY USING GAIN-MATCHED OUTPUT COUPLERS

GOVERNMENT SUPPORT

This invention was made with government support under Contract No. HR0011-05-C-0155 awarded by Defense Advanced Research Projects Agency and under Grant No. AST0905592 awarded by the National Science Foundation. The government has certain rights in this invention.

RELATED APPLICATION

This application claims the benefit of U.S. Provisional Application No. 61/325,434, filed Apr. 19, 2010, the entire content of which is incorporated herein by reference.

BACKGROUND

Mode-locking using Kerr nonlinearity, also known as Kerr-lens mode-locking (KLM), can be used to generate ultrashort pulses in the few-cycle regime directly from laser oscillators. The KLM mechanism, which is an effective saturable absorber, leads to pulse shortening; and the pulse shortening counters pulse lengthening that is caused by gain filtering experienced by the pulses. Consequently, mode-locked lasers generating femtosecond pulses are pumped well above the threshold for obtaining enough intracavity pulse energy to induce the nonlinearity and are operated on one of the edges of the cavity stability regions where the KLM strength is maximized, which usually results in less-stable operation, critical cavity alignment and reduced beam quality.

If, however, there would be no or only strongly reduced gain filtering, which implies that the total cavity loss has the same spectral profile as the gain, an arbitrary low KLM action could sustain short pulses covering the spectral range where the intracavity dispersion is well compensated. This result may lead to mode-locking with less cavity misalignment, lower intracavity pulse energy, and greatly improved beam quality. Creation of such frequency-dependent intracavity loss has been demonstrated previously by adding a thin angle-tuned etalon in a titanium-doped sapphire (Ti:sapphire) regenerative amplifier [C. P. J. Barty, et al., "Regenerative Pulse Shaping and Amplification of Ultrabroadband Optical Pulses," 21 Opt. Lett. 219-221 (1996)]. There are several disadvantages, however, of using etalons in laser oscillators, including the following:

(1) the etalon behaves as an additional lossy component that dramatically lowers the laser efficiency;

(2) since etalons are based on multiple reflections between two fixed surfaces, the shape of the transmittivity and transmitted phase are dominated by the interference behavior and cannot be controlled independently; and (3) for broadband lasers, the thickness of the required etalon will be very small, which makes it very challenging, in terms of alignment and manufacturing capabilities, to produce loss with the right peak location and linewidth.

SUMMARY

Mode-locked laser cavities with gain-matching output couplers and methods for using the laser are described herein. Various embodiments of the apparatus and methods may include some or all of the elements, features and steps described below.

The laser cavity can include a gain medium for amplifying a light pulse, wherein the gain medium has a gain profile for amplifying the light pulse as a function of wavelength across a range of wavelengths; at least one mirror on one side of the gain medium; and an output coupler that, together with the mirror(s), defines a light path in the laser cavity. The gain medium is positioned in the light path, and the output coupler has a output profile for coupling out the light pulse as a function of wavelength across the range of wavelengths. The output profile of the output coupler substantially matches the gain profile of the gain medium across the range of wavelengths (e.g., wherein the saturated gain and output profiles, when normalized to its own peak value, diverge from each other by less than a value of 1%, 3%, 5%, 10% or 20% across the range of wavelengths).

The output couplers of this invention can be used to transmit (where the output coupler transmits the output pulses) or reflect (where the output coupler reflects the output pulses) with a profile that closely matches the gain profile in the cavity without dramatically affecting laser efficiency while still maintaining well-compensated intracavity dispersion over the entire gain bandwidth. The output couplers can accordingly provide for more-stable laser operation, can increase the ease by which amplified pulses are obtained in the laser cavity, and can reduce the power needed (e.g., down to the level just above the lasing threshold, which is 2.5 W in our demonstration) to obtain a short amplified pulse in the laser cavity.

BRIEF DESCRIPTION OF THE DRAWINGS

In the accompanying drawings, like reference characters refer to the same or similar parts throughout the different views. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2% by weight or volume) can be understood as being within the scope of the description; likewise, if a particular shape is referenced, the shape is intended to include imperfect variations from ideal shapes, e.g., due to machining tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "upper," "beneath," "below," "lower," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, the singular forms, "a," "an" and "the," are intended to include the plural forms as well, unless the context clearly indicates otherwise. Additionally, the terms, "includes," "including," "comprises" and "comprising," specify the presence of the stated elements or steps but do not preclude the presence or addition of one or more other elements or steps.

Described herein is a laser output coupler (OC), called "gain-matched OC," that incorporates into its output profile a frequency-dependence that has the same (or substantially the same) spectral profile as the gain to reduce the gain-filtering effect. In the absence of an additional lossy component introduced to the cavity, the laser efficiency will not be negatively affected. Within the gain bandwidth of the laser gain medium, the main features of the output coupler are as follows:

(1) the output coupling is designed to have an output profile with the same spectral profile in terms of shape, bandwidth, and peak locations as the gain spectrum of the laser gain medium; and (2) the dispersion added to the circulating intracavity pulses by the output coupler can be compensated using low loss components (e.g., chirped mirrors, materials at Brewster's angle, etc.).

In practice, the above features can be implemented on the dielectric coating on the reflecting or transmitting output couplers used in both linear and ring cavity lasers. As used herein, a "transmitting output coupler" is a component used to transmit part of the circulating intracavity optical power as laser output, while a "reflecting output coupler" is a component used to reflect part of the circulating intracavity optical power as laser output.

Figure 1:
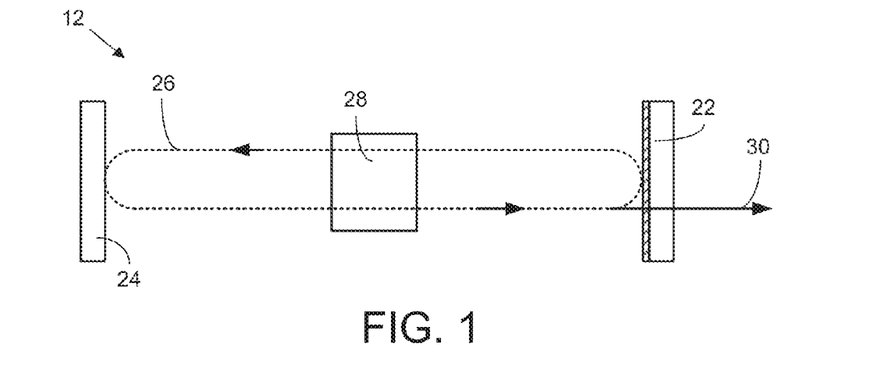
FIG. 1 is a schematic illustration of a linear cavity with a gain-matching transmitting output coupler.
Figure 2:
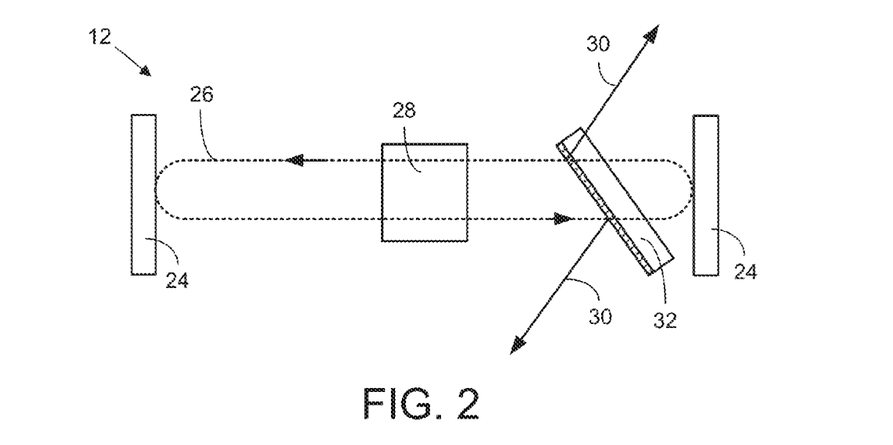
FIG. 2 is a schematic illustration of a linear cavity with a gain-matching reflecting output coupler.

Representative configurations of the inverse-gain/gain-matched output couplers are shown in FIGS. 1-4. A linear cavity laser 12 with a transmitting output coupler 22 is shown in FIG. 1. The linear cavity is bounded with a laser mirror 24, with the intracavity pulse 26 circulating (e.g., reciprocating) through a gain medium 28 there between and an output pulse 30 exiting through the transmitting output coupler 22. A linear cavity laser 12 with a reflecting output coupler 32 is shown in FIG. 2. In this embodiment, the linear cavity is bounded with a pair of laser mirrors 24, and the gain medium 28 and the reflecting output coupler 32 are positioned between the mirrors 24 in the path of the reciprocating intracavity pulse 26. The output pulse 30 is reflected out of the cavity by the reflecting output coupler 32. The gain medium 28 can comprise, for example, titanium-doped sapphire (Ti:Sapphire), chromium-doped forsterite ($Cr:Mg_2SiO_4$), $Cr^{4+}$:YAG, Yb-doped lasers, Er-doped lasers, Er:Yb-doped lasers, Tm-doped lasers, Ho-doped lasers, ZnSe, chromium-doped $LiCaAlF_6$ (Cr:LiCAF), and chromium-doped $LiSrAlF_6$ (Cr:LiSAF). The output coupler 32 can comprise, for example, alternating layers of (a) a low-refractive-index material, such as $SiO_2$, and (b) a high-refractive index material, such as $Nb_2O_5$, $TiO_2$ or $Ta_2O_5$.

Figure 3:
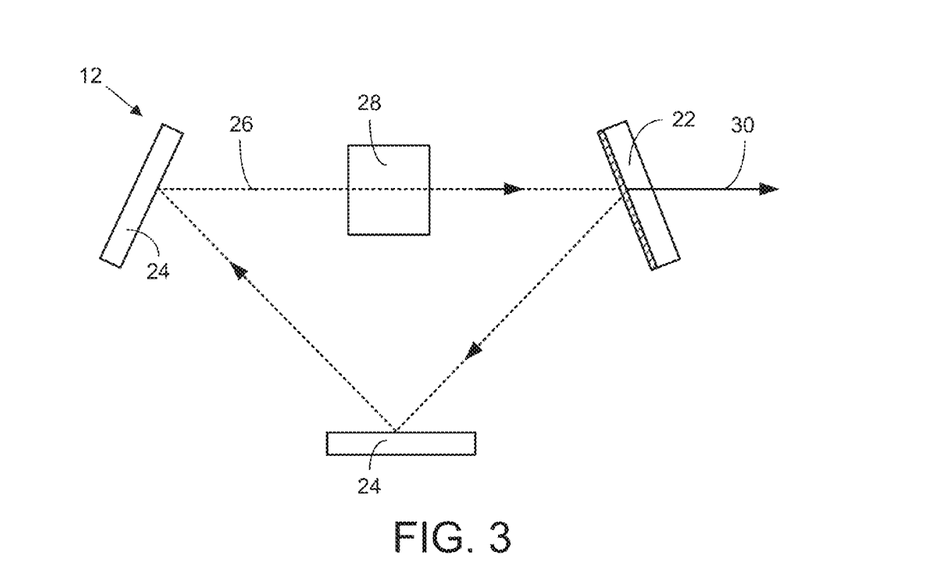
FIG. 3 is a schematic illustration of a ring cavity with a gain-matching transmitting output coupler.
Figure 4:
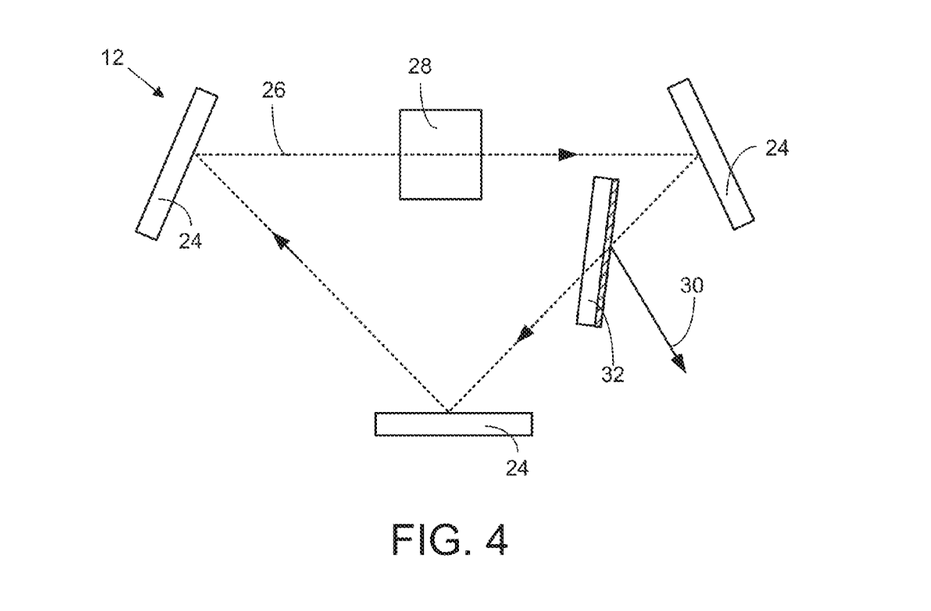
FIG. 4 is a schematic illustration of a ring cavity with a gain-matching reflecting output coupler.

A ring cavity laser 12 with a transmitting output coupler 22 is shown in FIG. 3, wherein the intracavity pulse 26 traverses a ring cavity bounded by the transmitting output coupler 22 and two laser mirrors 24. The gain medium 28 is positioned in one branch of the ring, and the output pulse 30 exits through the transmitting output coupler 22. A ring cavity laser 12 with a reflecting output coupler 32 is shown in FIG. 4. In this embodiment, the ring cavity is bounded by three laser mirrors 24, and the output pulse 30 is reflected out of the ring cavity by the reflecting output coupler 32.

The cavities illustrated in FIGS. 1-4 can be waveguide-based, in free-space, or a mix of the two. The intracavity pulses 26 can therefore be guided by the laser mirrors 24, as shown in the schematic illustrations of FIGS. 1-4, or by any of various types of waveguide, which enables the omission of some of the illustrated laser mirrors 24. However, one can also use more laser mirrors 24 to fold the laser cavity. The gain medium 28 can be a free-space component or a section of doped waveguide. The transmitting output coupler 22 is designed with a transmission (output) profile that matches the gain spectrum; and the reflected phase that is added to the circulating intracavity pulse 26 can be well-controlled within the bandwidth of the gain medium 28. In the design of reflecting output couplers 33, the output coupler 32 is designed with a reflectivity (output) profile that matches the gain spectrum; and the transmitted phase that is added to the circulating intracavity pulse 26 can be well-controlled within the bandwidth of the gain medium 28.

Figure 5:
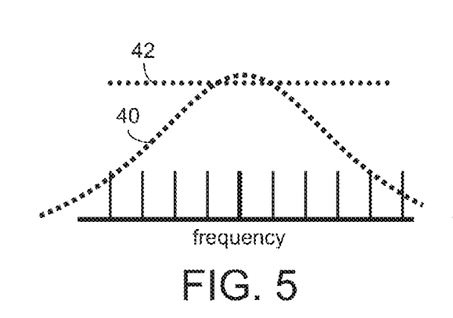
FIG. 5 is a plot of a cavity gain and output profile in continuous-wave operation where the gain is provided by the laser medium only as a function of frequency against a constant loss, supporting a single lasing frequency or a narrow band of lasing frequencies.
Figure 6:
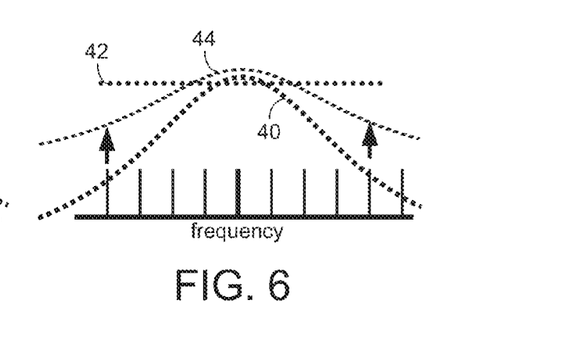
FIG. 6 is a plot of a cavity gain and output profile in conventional nonlinearity-assisted mode-locking operation with low pulse energy where the gain as a function of frequency is assisted by a weak Kerr-lens effect against a constant loss, supporting pulses with broader bandwidth.
Figure 7:
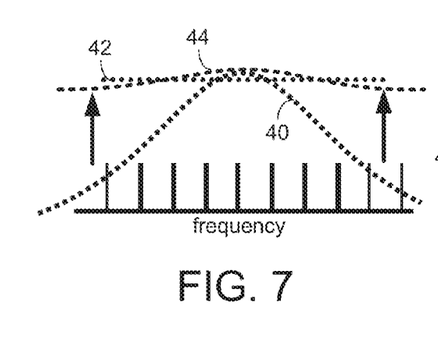
FIG. 7 is a plot of a cavity gain and output profile in conventional nonlinearity-assisted mode-locking operation with high pulse energy where the gain as a function of frequency is assisted by a strong Kerr-lens effect against a constant loss, supporting pulses with even broader bandwidth.

The process by which a laser with a constant loss profile changes from continuous-wave operation (FIG. 5) to mode-locking operation with the aid of nonlinearity of different strengths is illustrated via the plots of FIGS. 6 and 7. In continuous-wave operation, the laser with constant loss 42 has a gain profile as a function of frequency 40 that is solely provided by the gain medium, wherein only a single frequency or a narrow band of frequencies lase due to a strong gain-filtering effect. With small perturbations to the cavity, more neighboring modes will be emitted for a short time period, which generates instantaneous optical pulses inside the cavity that help to initiate mode-locking through the Kerr-nonlinearity. The Kerr-nonlinearity provides additional gain proportional to the pulse intensity by affecting the beam overlap with the gain medium that favors high-intensity pulses. This extra gain assists to compensate for the gain-filtering effect that hampers the mode-locking operation. The effects of weak and strong Kerr-lens assisted gain are shown in FIG. 6 and FIG. 7, respectively. The broadened effective gain profiles 44 caused by the Kerr-lens nonlinearity of different strengths support pulses of different bandwidths as shown. To overcome strong gain-filtering, larger intracavity pulse energy is required for initiation of mode-locking and to support ultrashort pulses.

Figure 8:
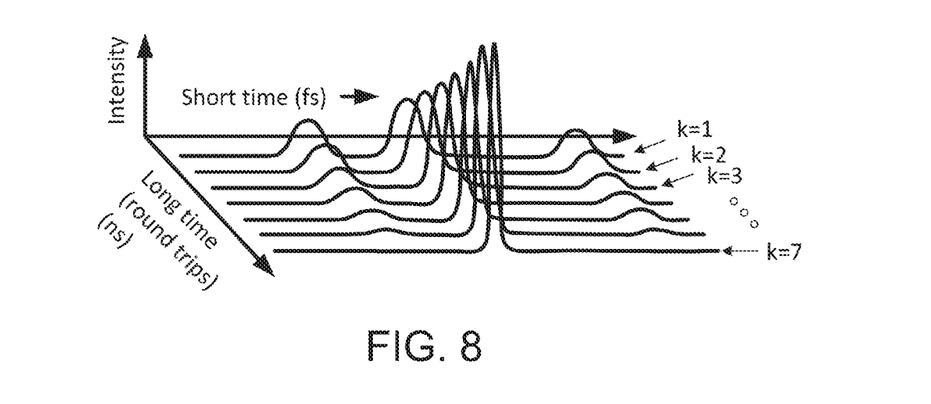
FIG. 8 is a plot illustrating how mode-locking assisted by Kerr-lens nonlinearity starts in a laser cavity from perturbations.

An illustration of how mode-locking assisted by Kerr-lens nonlinearity starts in a laser cavity from perturbations is provided in FIG. 8. Due to the Kerr-lens nonlinearity, pulses with different intensity see different overlap with the pump beam and get different amplification accordingly. When the cavity is perturbed, a few frequencies lase simultaneously and produce random intracavity pulses with high instantaneous intensity. When the cavity is aligned in such a way that benefits a high intensity, a stronger pulse can collect more photons than weaker ones after each round-trip and becomes even stronger. After several round-trips, only the strongest pulse survives.

Figure 9:
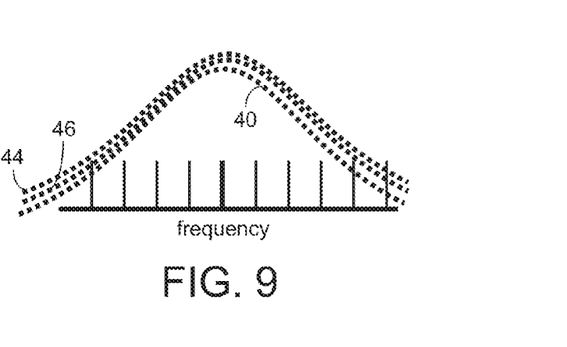
FIG. 9 is a plot of a cavity gain and output profile in the mode-locking operation requiring much reduced nonlinearity where the laser output as a function of frequency matches the laser gain profile as a function of frequency due to the introduction of a gain-matching output coupler.
Figure 10:
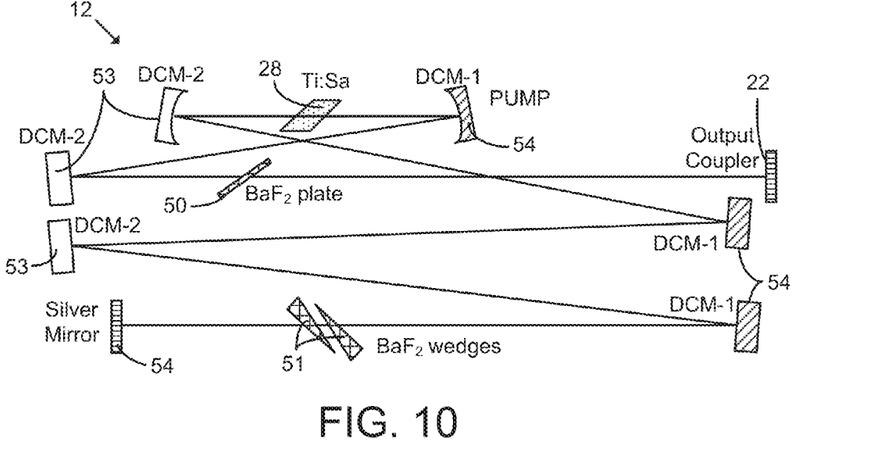
FIG. 10 is a schematic illustration of a Ti:sapphire laser configuration for experimental demonstration.
Figure 11:
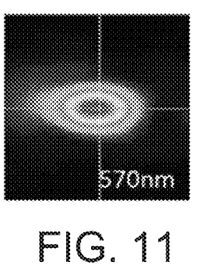
FIG. 11 shows the output beam profile from the laser configuration of FIG. 10 after passing through a 10-nm interference filter centered at 570 nm.
Figure 12:
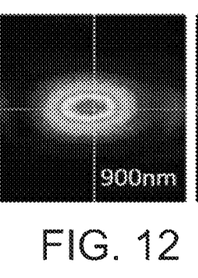
FIG. 12 shows the output beam profile from the laser configuration of FIG. 10 after passing through a 10-nm interference filter centered at 900 nm.
Figure 13:
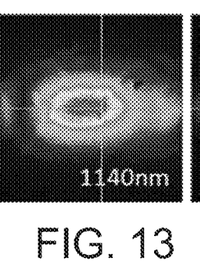
FIG. 13 shows the output beam profile from the laser configuration of FIG. 10 after passing through a 10-nm interference filter centered at 1140 nm.
Figure 14:
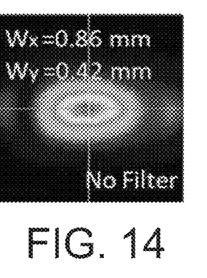
FIG. 14 shows the output beam profile from the laser configuration of FIG. 10 with no filter.

FIG. 9 illustrates the flattening of the net-gain profile by incorporating into the laser cavity a gain-matched output coupler having an output profile 46 as a function of frequency that approximately matches the profile of the gain 40. The gain-filtering effect is greatly reduced, even eliminated, or even overcompensated due to the output coupler, which consequently lowers the required intracavity pulse energy for initiation of mode-locking and broadband operation.

Experimental Demonstration of the Invention:

For this experimental demonstration, a broadband dielectric transmitting output coupler was designed for linear-cavity Ti:sapphire lasers. With this output coupler, mode-locking was initiated and run stably with pump powers just above the continuous wave (cw) lasing threshold. In order to design the output coupler with an output profile that matched the gain profile, the gain profile of Ti:sapphire crystal was first measured and used to optimize a dielectric output coupler coating with a peak transmission of 4% using 47 layers of $SiO_2$/$Nb_2O_5$ on a fused-silica substrate. As shown in FIGS. 10-14, the corresponding dispersion of the output coupler 22 can be compensated with a 1.1 mm-thick $BaF_2$ plate 50 placed at the Brewster angle.

The laser design was verified numerically using a simulation model for characterizing mode-locked lasers [described in Michelle Y. Sander, et al., "Dynamics of Dispersion Managed Octave-Spanning Titanium:Sapphire Lasers," 26 J. Opt. Soc. Am. B 743-749 (2009)], and our result showed that the saturable absorber action can be indeed greatly reduced. To further demonstrate gain-matched output coupling experimentally, the output coupler was used in a commercial 85 MHz linear-cavity Ti:sapphire laser 12 (Menlo Systems Octavius-85M, see FIG. 10). The intracavity dispersion was compensated by three pairs of double-chirped mirrors 53 and 54 (DCM-1 and 2) and three $BaF_2$ plates 50 and 51 including two adjustable wedges 51 for dispersion fine-tuning. FIGS. 11-14 show the mode-locked beam profile without an interference filter (FIG. 11) and after passing through 10 nm filters centered at 570 nm (FIG. 12), 900 nm (FIG. 13), and 1140 nm (FIG. 14) under 5.5 W pumping.

No significant changes in mode size were observed when changing the pump power. The laser can be initiated very easily by slightly tapping the end mirror. Compared to the original laser with an uncompensated gain-filtering effect, the new design, described herein, can provide the following advantages:

(1) much better beam quality with nearly no wavelength dependence across the octave-spanning range, (2) stronger resistance to environmental disturbances even when the cavity is directly exposed to free space, (3) a much lower mode-locking threshold, and (4) an ability to operate the cavity in the center of the stability range; the laser, therefore, is more stable in response to perturbations.

Figure 15:
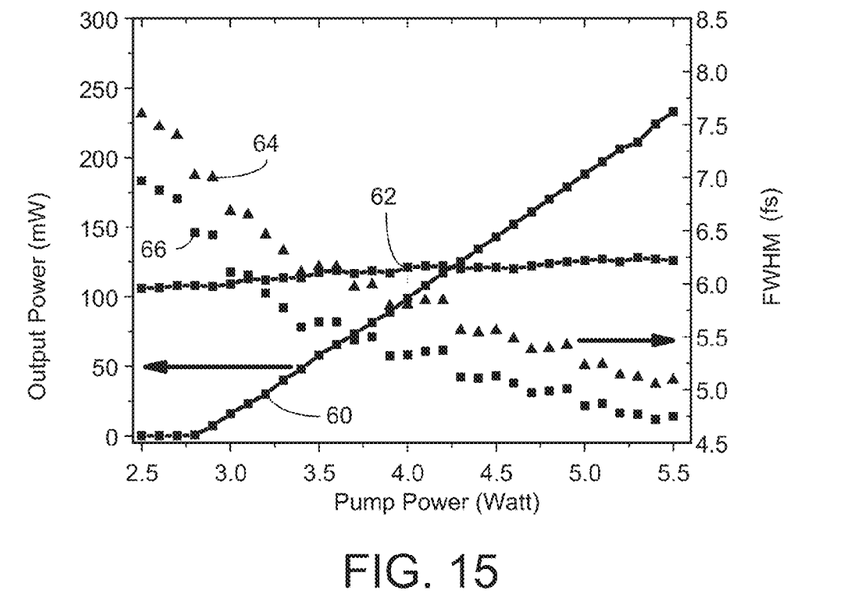
FIG. 15 is a plot of pump power versus laser output power in mode-locked and continuous-wave operation (left axis) and intracavity and output pulsewidth (right axis).
Figure 16:
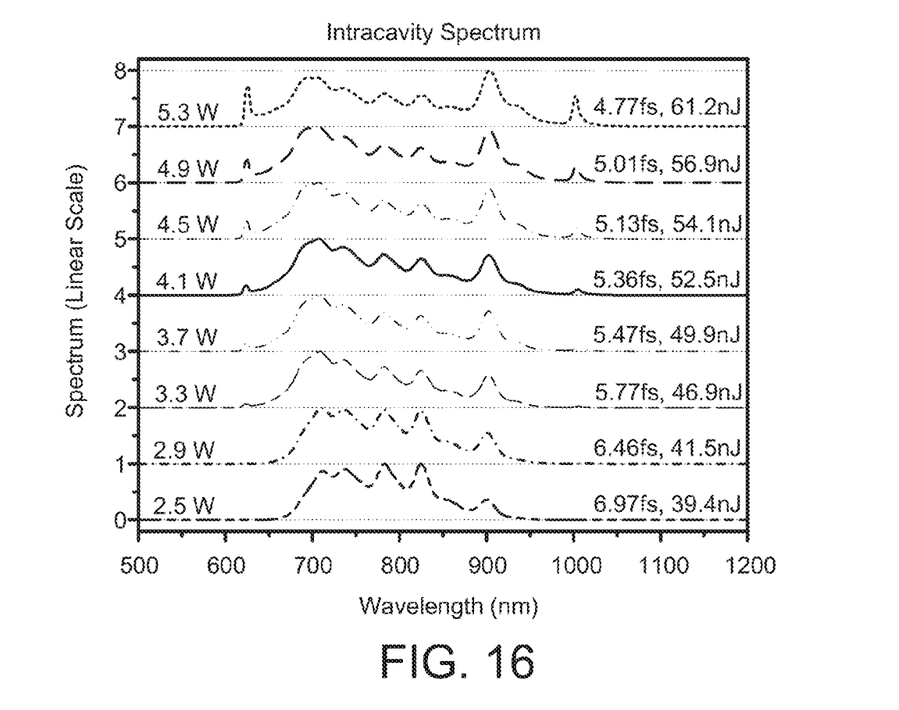
FIG. 16 provides a series of plots of intracavity spectra under different pump power levels.

To quantitatively evaluate the performance of the laser, several laser parameters for different pump power levels were measured and plotted in FIG. 15, which shows the continuous-wave power 60, the mode-locked power 62, the output pulsewidth 64, and the intracavity pulsewidth 66. The intracavity spectra under different pump powers are shown in FIG. 16. The results include the following.

(1) Mode-locking was initiated at 2.9-W continuous-wave pump power (shown by plot 60), which is just above the continuous wave threshold of 2.85 W, when the continuous wave output power was only 7 mW.

(2) Once mode-locked, the mode-locked pump power (shown by plot 62) could be further decreased to 2.5 W while still generating a transform-limited output pulsewidth ($\tau$) 44 of less than 8 fs with greater than 100-mW output power.

(3) Due to the special profile of the inverse-gain output coupler, the average cavity loss due to output coupling decreased as the laser bandwidth increased. This relationship explains the large difference between the continuous-wave output power 60 and the mode-locked output power 62 near the laser threshold. The output pulsewidths (τ) 64 were longer than the intracavity pulsewidths (τ) 66.

(4) As pump power increased, the intracavity pulse energy also increased, which induced more nonlinearity and consequently resulted in more broadband spectra and shorter pulsewidths (τ). However, the output power stayed almost constant since the increase in intracavity pulse energy was compensated by the decrease in output coupling.

The method was demonstrated here towards using the required nonlinearity in a modelocked laser using the Kerr-Lens-Mode-locking technique. However, the method is in general applicable to any modelocked laser to reduce the required nonlinearity.

Figure 17:
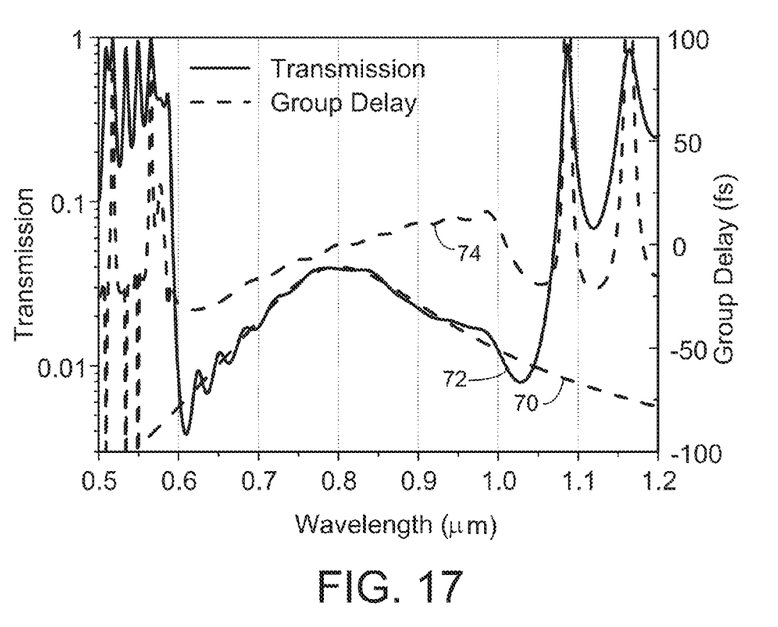
FIG. 17 is a plot of transmission, group delay and gain profile as a function of wavelength.

In FIG. 17, the gain profile 70 of a titanium:sapphire gain medium in a laser cavity and the transmission (output) profile 72 of a gain-matched output coupler through which the pulse exits the cavity are plotted as a function of wavelength. As shown, the gain profile 70 of the gain medium and the transmission (output) profile 72 of the output coupler approximately match over a substantial band of wavelengths. The group delay 74 of the pulse is also plotted as a function of wavelength in FIG. 17. The wavelength range of the output laser pulse is about 600 nm to about 1000 nm.

Figure 18:
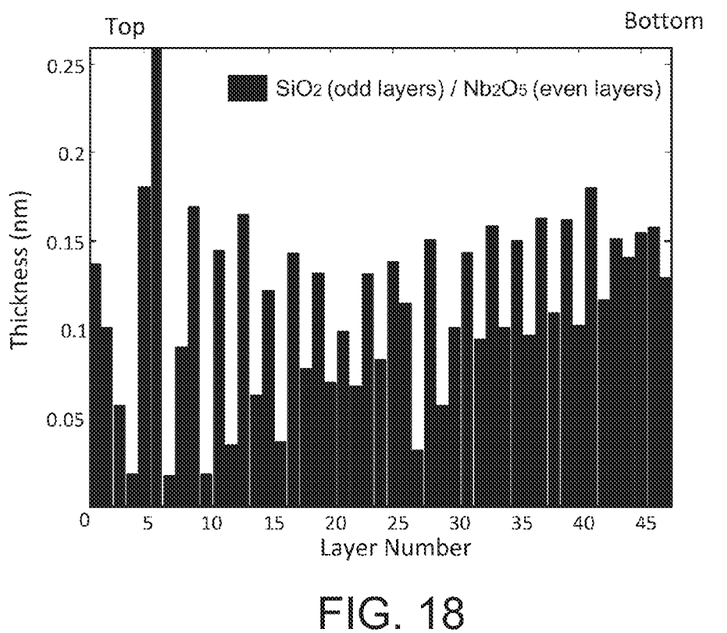
FIG. 18 is a plot showing the layer-by-layer thickness profile of a $SiO_2/Nb_2O_5$ gain-matching output coupler.

The output coupler used in the system for which the profiles are plotted in FIG. 17 comprises 47 layers of alternating $SiO_2$ and $Nb_2O_5$ stacks. A plot showing the layer-by-layer thickness profile of a $SiO_2/Nb_2O_5$ gain-matched output coupler is provided in FIG. 18, wherein the odd-numbered layers represent $SiO_2$, and the even-numbered layers represent $Nb_2O_5$. Dispersion of the output coupler in this embodiment can be compensated by a 1.1 mm $BaF_2$ plate.

Variables of the output coupler that can be manipulated to match the profile of the gain medium include composition (to thereby manipulate the refractive index through the output coupler), the number of layers in the output coupler, and the thickness of each layer. As shown for the embodiment of FIG. 18, the layers of the output coupler can include an alternating sequence of (a) a low-refractive-index material, such as $SiO_2$, and (b) a high-refractive index material, such as $Nb_2O_5$, $TiO_2$ or $Ta_2O_5$.

The design of the layered structure of the output coupler can be carried out using a computer including a processor coupled with a computer-readable storage medium in which is stored an optical-coating design tool, such as OPTILAYER thin-film software (available from OptiLayer, Ltd., Moscow, Russia). One can start with an initial base configuration of layers and then, in an iterative process, determine via a global algorithm where the greatest impact toward matching the profile of the gain medium can be made by (1) increasing or decreasing the layer thickness of one or more of the layers, (2) adding or removing one or more layers from the structure, or (3) changing the type of material assigned to one or more layers until a structure is generated (such as a structure having the design shown in FIG. 18) that will have an output profile (the output coupling can be considered as loss for the laser cavity) substantially matching that of the gain medium. Moreover, the dispersion added to the circulating intracavity pulses due to the output-coupler design can be compensated by other types of low-loss components (e.g., chirped mirrors, materials at Brewster's angle, etc.). The design tool(s) perform iterative procedures that optimize towards minimum weighted deviation from the design goal of output coupling and dispersion based on the concept mentioned above.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/100^{th}$, $1/50^{th}$, $1/20^{th}$, $1/10^{th}$, $1/5^{th}$, $1/3^{rd}$, $1/2$, $3/4^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references optionally may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:
1. A mode-locked laser cavity comprising:
a mode-locking mechanism configured to generate mode-locked pulse oscillation in the cavity;
a gain medium for amplifying a light pulse, the gain medium having a saturated gain profile for amplifying the light pulse as a function of wavelength;
at least one mirror on one side of the gain medium; and
an output coupler that, together with the mirror(s), defines a light path in the laser cavity, wherein the gain medium is positioned in the light path, wherein the output coupler is selected from:
(a) a transmitting output coupler configured to transmit an output portion of the light pulse out of the laser cavity and to reflect a recirculating portion of the light pulse along the light path back through the gain medium; and
(b) a reflecting output coupler configured to reflect the output portion of the light pulse out of the laser cavity and to transmit the recirculating portion of the light pulse along the light path back through the gain medium,
wherein the output coupler is configured to transmit or reflect the output portion of the light pulse from the laser cavity with an output profile that is a function of wavelength, and wherein the output profile of the output coupler substantially matches the saturated gain profile of the gain medium across a range of lasing wavelengths.

2. The laser cavity of claim 1, wherein the range of wavelengths over which the output profile of the output coupler substantially matches the saturated gain profile of the gain medium extends across at least 25% of the full-width-half-maximum of the saturated gain profile.

3. The laser cavity of claim 1, wherein the range of wavelengths over which the output profile of the output coupler substantially matches the saturated gain profile of the gain medium extends across at least 50% of the full-width-half-maximum of the saturated gain profile.

4. The laser cavity of claim 1, wherein the range of wavelengths over which the output profile of the output coupler substantially matches the saturated gain profile of the gain medium extends across at least 100% of the full-width-half-maximum of the saturated gain profile.

5. The laser cavity of claim 1, wherein the range of wavelengths over which the output profile of the output coupler substantially matches the saturated gain profile of the gain medium extends across at least 200% or more of the full-width-half-maximum of the saturated gain profile.

6. The laser cavity of claim 1, wherein the output coupler includes a substrate and a dielectric coating, and wherein the output profile is due to the dielectric coating.

7. The laser cavity of claim 6, wherein the dielectric coating comprises alternating layers of a lower-refractive-index material and a higher-refractive index material.

8. The laser cavity of claim 7, wherein the lower-refractive-index material is $SiO_2$ and the higher-refractive index material is selected from $Nb_2O_5$, $TiO_2$ and $Ta_2O_5$.

9. The laser cavity of claim 7, wherein the alternating layers have substantially differing thicknesses.

10. The laser cavity of claim 6, wherein the substrate comprises fused silica.

11. The laser cavity of claim 1, wherein the output coupler is configured to reflect the output portion of the light pulse out of the laser cavity.

12. The laser cavity of claim 1, wherein the output coupler is configured to transmit the output portion of the light pulse through the output coupler.

13. The laser cavity of claim 1, further comprising a $BaF_2$ plate positioned in the light path for compensating dispersion of the output coupler.

14. The laser cavity of claim 1, wherein the gain medium includes a gain composition selected from titanium-doped sapphire, chromium-doped forsterite, $Cr^{4+}$:YAG, Yb-doped lasers, Er-doped lasers, Er:Yb-doped lasers, Tm-doped lasers, Ho-doped lasers, ZnSe, chromium-doped $LiCaAlF_6$, and chromium-doped $LiSrAlF_6$.

15. A method for constructing a short pulse laser comprising:
circulating a light pulse within a closed optical path in a laser cavity;
employing a mode-locking mechanism to generate mode-locked oscillation of the light pulse in the cavity;
repeatedly passing the light pulse through a gain medium in the cavity, wherein the gain medium amplifies the light pulse with a saturated gain profile as a function of lasing wavelengths; and
removing an output portion of the light pulse from the cavity with an output coupler, wherein the output coupler is selected from:
(a) a transmitting output coupler that transmits the output portion of the light pulse out of the cavity and that reflects a recirculating portion of the light pulse along the closed optical path back through the gain medium; and
(b) a reflecting output coupler that reflects the output portion of the light pulse out of the cavity and that transmits the recirculating portion of the light pulse along the closed optical path back through the gain medium,
wherein the output coupler transmits or reflects the output portion of the light pulse from the cavity with an-output profile that substantially matches the saturated gain profile across a range of the lasing wavelengths.

16. The method of claim 15, wherein the range of wavelengths over which the output profile of the output coupler substantially matches the saturated gain profile of the gain medium extends across at least 25% of the full-width-half-maximum of the laser gain profile.

17. The method of claim 15, wherein the output coupler removes the output portion of the light pulse from the cavity by reflecting the output portion of the light pulse.

18. The method of claim 15, wherein the output coupler removes the output portion of the light pulse from the cavity by transmitting the output portion of the light pulse.

19. The method of claim 15, wherein the output portion of the light pulse has a pulsewidth of less than 8 fs.

20. The laser cavity of claim 1, wherein the mode-locking mechanism includes a saturable absorber.

* * * * *